April 7, 1931. C. R. HITZ 1,799,791
ICE CREAM DIPPER
Filed Sept. 13, 1930
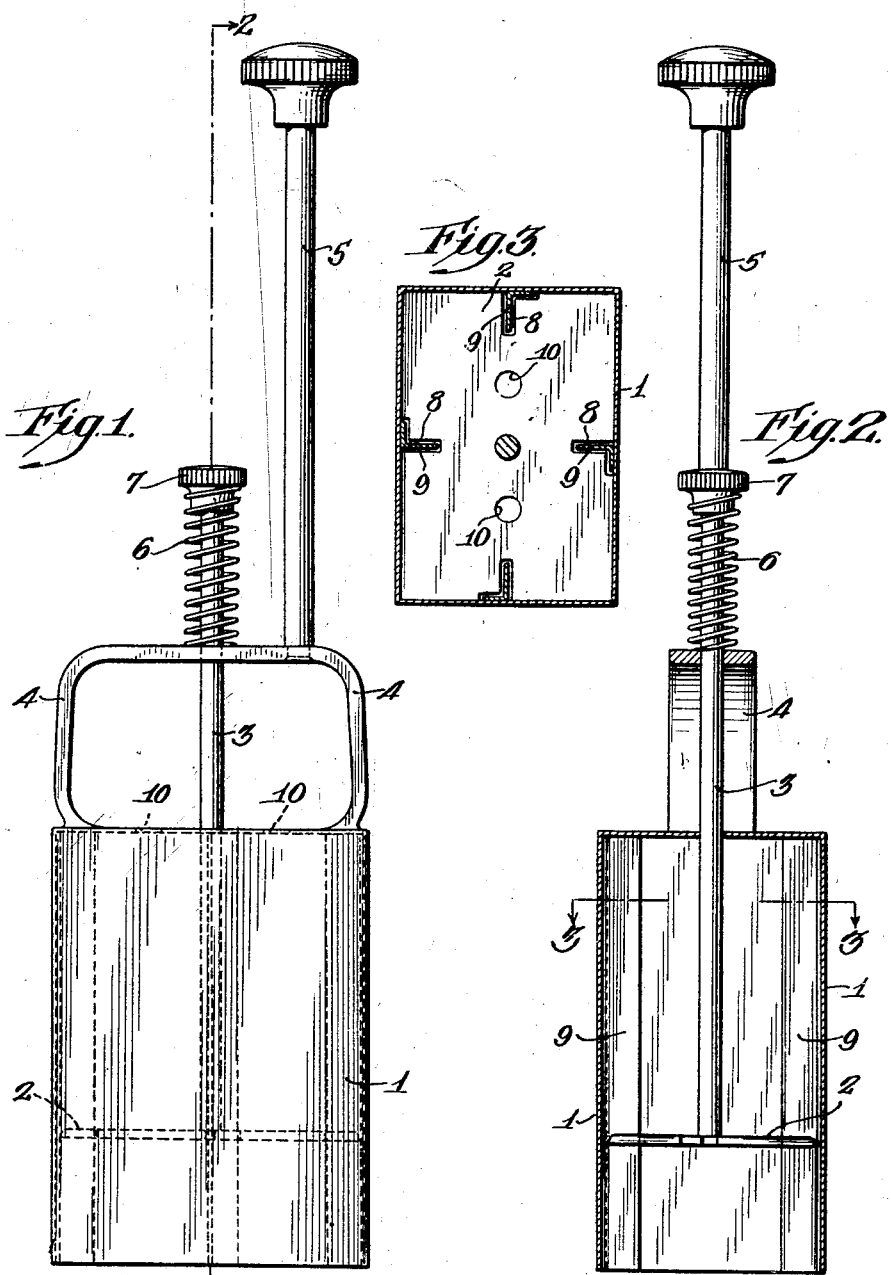
Inventor:
Charles R. Hitz.
Louis Necho
Attorney.

Patented Apr. 7, 1931

1,799,791

UNITED STATES PATENT OFFICE

CHARLES R. HITZ, OF PHILADELPHIA, PENNSYLVANIA

ICE-CREAM DIPPER

Application filed September 13, 1930. Serial No. 481,709.

My invention relates to a new and useful ice cream dipper particularly adapted for "dishing out" or removing from a freezer or other container, a predetermined quantity of ice cream or similar concoction in a bulk adapted to fit in a standard size container of predetermined capacity.

My invention further relates to a sanitary dipper, which when not in use, may be stood in shallow water sufficient to seal the bottom edge thereof, the operative parts of said dipper being out of contact with surrounding objects.

My invention still further relates to a novel ice cream dipper comprising easily and completely detachable parts for cleaning purposes.

It is now the practice when ice cream is sold in bulk, such as in pints, quarts, etc. to fill a pint box or container by repeated small dippings which are packed into the container with a spoon or the like, the operation of packing a pint or quart container of ice cream usually consuming from five to ten minutes hard work, causing a loss of trade, due to the necessity of keeping the customers waiting.

It is therefore, the object of my invention to provide a novel ice cream dipper which would sever or "dish out" a predetermined quantity of ice cream from a larger bulk, said predetermined quantity of ice cream being of a contour adapted to fit into a box or container of a corresponding predetermined capacity.

A further object of my invention is to produce an ice cream dipper which is composed of detachable parts which may be easily assembled for use and dismantled for cleaning purposes.

A still further object of my invention is to produce an ice cream dipper of a highly simplified, durable and inexpensive structure.

To the above ends my invention consists of a shell or casing closed at the top and open at the bottom, said casing being of any desired shape and of any predetermined volumetric capacity, a handle carried by the closed top of said casing, a push rod projecting upwardly from said handle, a plunger adapted to reciprocate within said casing, a stem for actuating said plunger projecting through the top of said casing and said handle, and a spring interposed intermediate the top of said handle and the upper end of said stem normally to retain said plunger in a raised position with respect to the open bottom end of said casing, there being vent holes provided in the closed top of said casing.

My invention still further consists of various other novel features of construction and advantage all as hereinafter described and claimed in connection with the annexed drawings in which:—

Fig. 1 is a side elevation of an ice cream dipper embodying my invention.

Fig. 2 is a section on line 2—2 of Fig. 1.

Fig. 3 is a section on line 3—3 of Fig. 2.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts, my novel ice cream dipper comprises a shell or casing 1 which is closed at its top and open at its bottom to simulate an inverted cup effect, said casing being preferably of a form to correspond to the form of standard pint, quart or other sized ice cream container, and being of any desired predetermined volumetric capacity to the end that one dip of the casing 1 would deliver a predetermined quantity of ice cream which would fit into the container of a corresponding shape and volumetric capacity. Within the casing 1, I provide the plunger 2 which is actuated by the stem 3. On the top of the container 1 is a handle member 4 from which projects the upwardly extending push rod 5 which will be hereinafter further referred to. The stem 3 projects upwardly through the top of the casing 1 through the handle 4 and carries the spring 6 confined between the top of said handle and the upper knob 7 which is threaded onto the upper end of said stem. The plunger 2 is slotted at 8 to engage the plates 9 which project inwardly from the walls of the casing 1, as will be best understood from Fig. 3. The plates 9 facilitate the insertion of the casing 1 into the ice cream during the "dipping" operation and further facilitate the displacement of the ice cream from the casing during the "delivery" operation. In the top of the casing 1, I provide one or more vent holes 10 to relieve the pressure of the air during the outward pressure of the plunger 2.

The operation is as follows:—

When it is desired to dispense a pint, quart or other quantity of ice cream the proper sized dipper is dipped into the ice cream freezer by pressure applied on the push rod 5 and the handle 4 until the plunger 2 moves upwardly into a contacting position with the top of the casing 1, and the stem 3 is in its uppermost position. This will indicate that the casing 1 is full of ice cream, that is, it contains a pint, quart or other quantity depending on the size of the casing 1. The dipper is then removed from the ice cream freezer, and is held above and in alignment with the standard cardboard container of a shape and size corresponding to the shape and size of the shell 1. With the dipper held in one hand by the handle 4 pressure is applied with the other hand upon the upper end of the stem 3 to push the plunger 2 downwardly displasing the ice cream from the shell 1 into the container. By this means a predetermined quantity of ice cream is dispensed by a single operation thereby entirely eliminating the necessity of slowly and laboriously packing a pint container by repeated dippings with the spoon or other implements, as has heretofore been the practice.

It will further be seen from Figs. 1 and 2 that I employ the springs 6 which tend normally to retain the plunger 2 at a position above the bottom edge of the casing 1 and out of contact with all objects, thereby rendering my device more sanitary.

When it is desired to clean my novel dipper it is merely necessary to unscrew the knob 7 at the top of the stem 3 whereupon the plunger 2 and the stem 3 are withdrawn downwardly from the casing 1 to permit a thorough washing of the inside of the casing and of the stem 3 and plunger 2. This need only be done at the close of business hours, as during working hours the entire dipper can be stood in shallow water to seal the bottom edge thereof and in this position the plunger 2 is out of contact with all objects.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

In a device of the character stated, a casing closed at its top and open at its bottom, a handle carried by the top of said casing, a push rod carried by said handle, a plunger within said casing, a stem for actuating said plunger extending through the top of said casing and through said handle, a detachable knob at the upper end of said stem, a spring wound around said stem and confined between the top of said handle and said knob normally to raise said stem above the bottom of said casing, and inwardly extending vertical flanges carried by the walls of said casing and engaging said plunger, there being vent holes in the closed top of said casing.

CHARLES R. HITZ.